(12) United States Patent
Ott et al.

(10) Patent No.: US 7,727,462 B2
(45) Date of Patent: *Jun. 1, 2010

(54) METHOD FOR MELTLESS MANUFACTURING OF ROD, AND ITS USE AS A WELDING ROD

(75) Inventors: Eric Allen Ott, Cincinnati, OH (US); Andrew Philip Woodfield, Cincinnati, OH (US); Clifford Earl Shamblen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/329,140

(22) Filed: Dec. 23, 2002

(65) Prior Publication Data

US 2004/0118245 A1   Jun. 24, 2004

(51) Int. Cl.
  B22F 3/02    (2006.01)
  B22F 1/00    (2006.01)
  B22F 9/18    (2006.01)
(52) U.S. Cl. .............. 419/66; 419/30; 75/351
(58) Field of Classification Search ........... 419/45, 419/41, 46, 54, 36, 66, 30; 228/199; 219/137 WM, 219/137 PS; 75/351
See application file for complete search history.

(56) References Cited

U.S. PATENT DOCUMENTS

| 1,969,396 | A | * | 8/1934 | Duftschmid | 419/6 |
|---|---|---|---|---|---|
| 2,100,545 | A | * | 11/1937 | Hiemke | 428/561 |
| 2,822,262 | A | * | 2/1958 | Benoit et al. | 75/374 |
| 2,833,030 | A | * | 5/1958 | Peaslee | 228/199 |
| 3,019,103 | A | * | 1/1962 | Alexander et al. | 419/19 |
| 3,152,389 | A | * | 10/1964 | Alexander et al. | 75/235 |
| 3,539,307 | A | * | 11/1970 | Baumel | 75/237 |
| 3,655,360 | A | * | 4/1972 | Lindquist | 419/19 |
| 3,723,109 | A | * | 3/1973 | Lacock et al. | 419/48 |
| 3,736,132 | A |   | 5/1973 | Easterday et al. | |
| 3,754,902 | A | * | 8/1973 | Boone et al. | 420/443 |

(Continued)

FOREIGN PATENT DOCUMENTS

GB    883 429 A    11/1961

(Continued)

OTHER PUBLICATIONS

ASM Handbook, vol. 7, Powder Metallurgy, definition of "sintering," p. 11, 1984.*

(Continued)

Primary Examiner—Roy King
Assistant Examiner—Jessee R. Roe
(74) Attorney, Agent, or Firm—McNees Wallace & Nurick, LLC

(57) ABSTRACT

An article made of a metallic material having its constituent elements is made by furnishing at least one nonmetallic precursor compound, wherein all of the nonmetallic precursor compounds collectively include the constituent elements of the metallic material in their respective constituent-element proportions. The precursor compounds are chemically reduced to produce particles comprising the metallic material, without melting the precursor compounds and without melting the metallic material. The particles may be consolidated into a rod, which may be used as a welding rod in a welding operation. Alternatively, the nonmetallic precursor compounds may be consolidated prior to the chemical reduction.

20 Claims, 2 Drawing Sheets

U.S. PATENT DOCUMENTS

| | | | |
|---|---|---|---|
| 3,814,635 A * | 6/1974 | Cometto et al. | 419/23 |
| 4,104,445 A * | 8/1978 | Dobo | 428/567 |
| 4,138,872 A * | 2/1979 | Lengyel | 72/262 |
| 4,537,625 A * | 8/1985 | Tenhover et al. | 419/36 |
| 4,624,706 A * | 11/1986 | Badia | 75/246 |
| 4,632,702 A * | 12/1986 | DiGiambattista | 75/228 |
| 4,752,334 A * | 6/1988 | Nadkarni et al. | 75/235 |
| 5,322,666 A | 6/1994 | Watwe | |
| 5,360,961 A * | 11/1994 | Ingall et al. | 219/137 PS |
| 5,779,761 A | 7/1998 | Armstrong et al. | |
| 5,897,801 A * | 4/1999 | Smashey et al. | 219/137 WM |
| 5,930,580 A | 7/1999 | Everett | |
| 5,958,106 A | 9/1999 | Armstrong et al. | |
| 6,302,649 B1 * | 10/2001 | Mukira et al. | 415/200 |
| 6,333,072 B1 * | 12/2001 | Lane et al. | 427/190 |
| 6,393,690 B1 * | 5/2002 | Snitchler et al. | 29/599 |
| 6,582,651 B1 * | 6/2003 | Cochran et al. | 419/5 |
| 6,737,017 B2 * | 5/2004 | Woodfield et al. | 419/30 |
| 2002/0068005 A1 | 6/2002 | Bernd et al. | |
| 2002/0073804 A1 | 6/2002 | Meiss | |
| 2003/0230170 A1 * | 12/2003 | Woodfield et al. | 75/613 |
| 2003/0231974 A1 * | 12/2003 | Woodfield et al. | 419/30 |
| 2004/0016319 A1 * | 1/2004 | Woodfield et al. | 75/351 |
| 2004/0115085 A1 * | 6/2004 | Steibel et al. | 419/63 |

FOREIGN PATENT DOCUMENTS

| | | | |
|---|---|---|---|
| WO | WO9915293 | * | 4/1999 |
| WO | WO 99/64638 | | 12/1999 |
| WO | WO 9964638 | | 12/1999 |

OTHER PUBLICATIONS

Gerdemann et al., Characterization of a Titanium Powder Produced Through a Novel Continuous Process, U.S. Department of Energy, Albany Research Center, Albany, Oregon, pp. 12-41 through 12-52, USA.

Moxson et al., Production, Characterization and Applications of Low Cost Titanium Powder Products, The Minerals, Metals & Materials Society, 1998, pp. 127-134, USA.

Baburaj et al., Production of Low Cost Titanium, The Minerals, Metals & Materials Society, 1998, pp. 89-97, USA.

Gerdemann, Steven J., Titanium Process Technologies, Advanced Materials & Processes, Jul. 2001, pp. 41-43, USA.

* cited by examiner

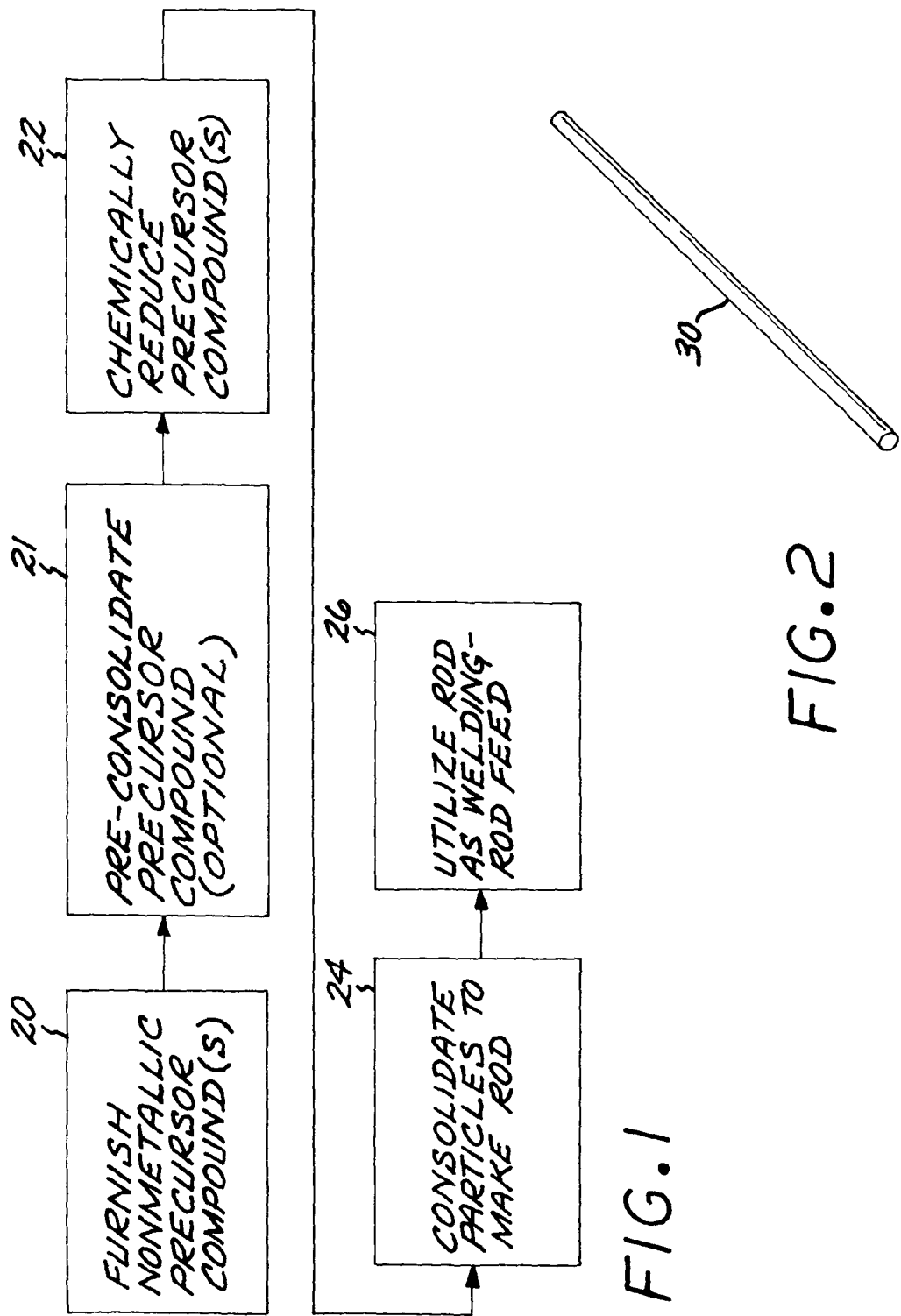

METHOD FOR MELTLESS MANUFACTURING OF ROD, AND ITS USE AS A WELDING ROD

This application claims priority to application Ser. No. 10/172,217, now U.S. Pat. No. 6,737,017.

This invention relates to the manufacturing of rod material that may be used as a welding-rod feed and, more particularly, to a meltless manufacturing process for making the rod.

BACKGROUND OF THE INVENTION

Welding is used to join two or more pieces of material together, to repair defects in the surface of a single piece of material, and to build up structures. In the first two applications, the welding may be accomplished by heating the piece(s) to either join them or to heal the defect, without adding additional material. The welding in each case may instead be accomplished by melting additional material, termed a filler metal, that subsequently is solidified to join the pieces or to fill the defect in the single piece or to build up a structure. The filler metal is usually supplied as a powder that is injected into the heated region being welded, or as a welding rod that is gradually fed into the heated region. The filler metal may be of the same composition as the piece or pieces being welded, or of a different composition.

There is sometimes a distinction made between "welding rod", taken to be of larger diameter, and "welding wire", taken to be of smaller diameter. As used herein to avoid any arbitrary distinction between them, the terms "rod" and "welding rod" include both larger-diameter and smaller-diameter forms of rod and welding-feed materials, and thence includes both what is sometimes referred to as welding rod and what is sometimes referred to as welding wire.

Most welding rod is made by melting the metallic alloy that is to form the welding rod, casting the molten alloy into a cast form, and then wire drawing the cast form to its final diameter and length. However, this approach is limited to those metallic alloys that are sufficiently ductile to be wire drawn without failing. For less-ductile alloys, such as some high-gamma-prime superalloys that are to be used as welding rod, the cast or powder-processed metallic alloy is extruded to its final form.

SUMMARY OF THE INVENTION

The present approach provides a technique for producing rod that is suitable for use as a welding rod. The approach is operable with a wide range of compositions of material, including some compositions that are extremely difficult or impossible to otherwise prepare as welding rod. Compositional variations and segregation within the welding rod are avoided. Impurities that are associated with the melting fabrication of welding rod are avoided. Manufacturing yields are improved over conventional approaches, particularly for those welding materials that cannot be readily drawn. The present approach is amenable to both large-scale and small-scale fabrication processing.

A method of manufacturing an article comprising a metallic material having its constituent elements includes first furnishing at least one nonmetallic precursor compound, wherein all of the nonmetallic precursor compounds collectively include the constituent elements of the metallic material in their respective constituent-element proportions. The method further includes chemically reducing the precursor compounds to produce particles comprising the metallic material, without melting the precursor compounds and without melting the metallic material, and thereafter consolidating the particles into a rod.

The nonmetallic precursor compound may be furnished in any operable form, such as metal-oxide precursor compounds or metal-halide precursor compounds. The precursor compounds may be selected to produce a wide range of types of metallic materials in the chemical reduction, such as nickel-base materials, iron-base materials, cobalt-base materials, and titanium-base materials, although the range of metallic materials is not so limited. A metallic material of particular interest is a titanium-base alloy.

The chemical reduction may be performed by any operable approach in which the precursor compounds and the metallic material are not melted. Techniques of particular interest include solid-phase reduction and vapor-phase reduction.

The consolidation is preferably performed without melting the metallic material. A preferred consolidation approach is containered extrusion.

The rod is preferably thereafter used as a welding-rod feed.

The meltless approach to producing the rod and the welding rod has particular advantages over conventional approaches wherein the metallic constituents are first melted and then solidified as either a cast material or a powder. The current approach provides metallic material with improved fabricability because of fine grain size, which results in lower flow stresses, and reduced elemental segregation, which results in improved ductility. The composition of the rod is not limited by the ability to melt the constituent elements together, and therefore compositions may be made that cannot be made by a melting approach. The incidence of some types of impurities, both chemical impurities such as impurity elements and physical impurities such as undesirable oxide dross, that are often found in conventionally produced weld rod are avoided using the present approach. Minor elements or other ingredients such as fluxes may be readily added to the welding rod during the manufacturing operation. Melt-related segregation of elements is avoided, so that the composition is more uniform throughout the welding rod on both a macroscopic and microscopic basis. On the other hand, if a variation in composition is desired, such as from end-to-end of the weld rod, the controlled variation may be achieved using the present approach.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a block flow diagram of an approach for manufacturing and using the rod;

FIG. 2 is a perspective view of a welding rod;

DETAILED DESCRIPTION OF THE INVENTION

Figure 3:
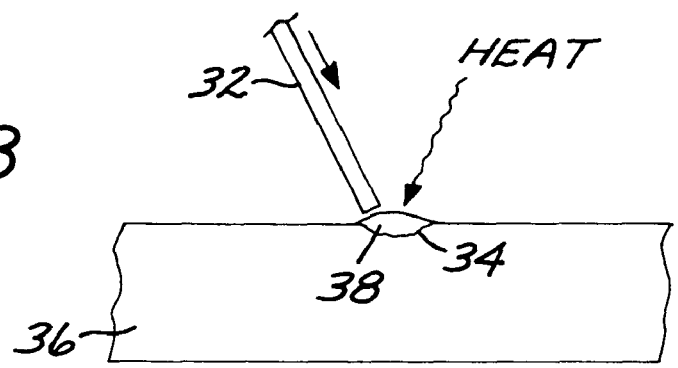
FIG. 3 is a schematic view of welding rod being used to repair defects in a piece of substrate material.

FIG. 1 is a block flow diagram illustrating a preferred method for preparing an article comprising a metallic material having its constituent elements. At least one nonmetallic precursor compound is furnished, step 20. All of the nonmetallic precursor compounds collectively include the constituent elements of the metallic material in their respective constituent-element proportions. The constituent elements may be supplied by the nonmetallic precursor compounds in any operable way. In the preferred approach, there is exactly one non-oxide precursor compound for each alloying element, and that one precursor compound provides all of the material for that respective metallic constituent in the alloy. For example, for a four-element metallic material that is the final result of the process, a first precursor compound supplies all of the first element, a second precursor compound supplies all of the second element, a third precursor compound supplies all of the third element, and a fourth precursor compound supplies all of the fourth element. Alternatives are within the scope of the approach, however. For example, several of the precursor compounds may together supply all of one particular metallic element. In another alternative, one precursor compound may supply all or part of two or more of the metallic elements. The latter approaches are less preferred, because they make more difficult the precise determination of the elemental proportions in the final metallic material. The final metallic material is typically not a stoichiometric compound, having relative amounts of the metallic constituents that may be expressed as small integers.

The metallic material and its constituent elements comprise any operable type of alloy. Examples include a nickel-base material, an iron-base material, a cobalt-base material, and a titanium-base material. (An "X-base" alloy has a higher percentage of element X by weight than any other element, and usually more than about 50 percent by weight of the material.) Some examples include: nickel-base materials such as alloys Rene™ 142, Rene™ 108, MarM 247, Rene™ 41, and Waspaloy™; cobalt-base materials such as alloy MarM 509; titanium-base materials such as Ti-6AI-4V and gamma-TiAI; and iron-base materials such as IN 909. The step of chemically reducing may include the step of producing the metallic material as a nickel-base superalloy.

A metallic material of particular interest is a titanium-base alloy. A titanium-base alloy has a greater weight percentage of titanium than any other element. It is particularly desired to make titanium-base welding rod with a low content of oxygen in solution and low impurity content to improve the weld properties.

The nonmetallic precursor compounds are selected to be operable in the reduction process in which they are reduced to metallic form. In one reduction process of interest, solid-phase reduction, the precursor compounds are preferably metal oxides. In another reduction process of interest, vapor-phase reduction, the precursor compounds are preferably metal halides. Mixtures of different types of nonmetallic precursor compounds may be used, as long as they are operable in the subsequent chemical reduction. Compatible innoculants may also be added at this point in the processing.

The nonmetallic precursor compounds are selected to provide the necessary metals in the final article, and are mixed together in the proper proportions to yield the necessary proportions of these metals in the article. For example, if the metallic material were to have particular proportions of titanium, aluminum, and vanadium in the ratio of 90:6:4 by weight, the nonmetallic precursor compounds are preferably titanium oxide, aluminum oxide, and vanadium oxide for solid-phase reduction, or titanium tetrachloride, aluminum chloride, and vanadium chloride for vapor-phase reduction. Nonmetallic precursor compounds that serve as a source of more than one of the metals in the final article may also be used. These precursor compounds are furnished and mixed together in the correct proportions such that the ratio of titanium:aluminum:vanadium in the mixture of precursor compounds is that required to form the metallic material in the final article (90:6:4 by weight in the example).

The precursor compound or compounds are chemically reduced (i.e., the opposite of chemical oxidation) to produce particles comprising the metallic material, step 22, without melting the precursor compounds and without melting the metallic material. As used herein, "without melting", "no melting", and related concepts mean that the material is not macroscopically or grossly melted for an extended period of time, so that it liquefies and loses its shape. There may be, for example, some minor amount of localized melting as low-melting-point elements melt and are diffusionally alloyed with the higher-melting-point elements that do not melt, or very brief melting for less than about 10 seconds. Even in such cases, the gross shape of the material remains unchanged.

In one preferred chemical reduction approach, termed vapor-phase reduction because the nonmetallic precursor compounds are furnished as vapors or gaseous phase, the chemical reduction may be performed by reducing mixtures of halides of the base metal and the alloying elements using a liquid alkali metal or a liquid alkaline earth metal. For example, titanium tetrachloride and the halides of the alloying elements are provided as gases. A mixture of these gases in appropriate amounts is contacted to molten sodium, so that the metallic halides are reduced to the metallic form. The metallic alloy is separated from the sodium. This reduction is performed at temperatures below the melting point of the metallic alloy. The approach is described more fully in U.S. Pat. Nos. 5,779,761 and 5,958,106, whose disclosures are incorporated by reference. Controllable amounts of gases such as oxygen and nitrogen may also be added into and mixed with the precursor compounds. These added gases are incorporated into the reduced metal. Typically in this gaseous addition process variation where oxygen is added, oxide-forming elements are also included in the nonmetallic precursor compounds, and these oxide-forming elements react with the gaseous additions to produce oxide dispersoids in the reduced metal. A similar approach is used to form nitrides when nitrogen is the added gas.

Chemical reduction at lower temperatures rather than higher temperatures is preferred. Desirably, the reduction is performed at temperatures of 600° C. or lower, and preferably 500° C. or lower. By comparison, prior approaches for preparing titanium— and other metallic alloys often reach temperatures of 900° C. or greater, and usually temperatures above the melting points of the alloys. The lower-temperature reduction is more controllable, and also is less subject to the introduction of contamination into the metallic alloy, which contamination in turn may lead to chemical defects. Additionally, the lower temperatures reduce the incidence of sintering together of the particles during the reduction step.

In another reduction approach, termed solid-phase reduction because the nonmetallic precursor compounds are furnished as solids, the chemical reduction may be performed by fused salt electrolysis. Fused salt electrolysis is a known technique that is described, for example, in published patent application WO 99/64638, whose disclosure is incorporated by reference in its entirety. Briefly, in fused salt electrolysis the mixture of nonmetallic precursor compounds, furnished in a finely divided solid form, is immersed in an electrolysis cell in a fused salt electrolyte such as a chloride salt at a temperature below the melting temperature of the alloy that forms from the nonmetallic precursor compounds. The mixture of nonmetallic precursor compounds is made the cathode of the electrolysis cell, with an inert anode. The elements combined with the metals in the nonmetallic precursor compounds, such as oxygen in the preferred case of oxide nonmetallic precursor compounds, are partially or completely removed from the mixture by chemical reduction (i.e., the reverse of chemical oxidation). The reaction is performed at an elevated temperature to accelerate the diffusion of the oxygen or other gas away from the cathode. The cathodic potential is controlled to ensure that the reduction of the nonmetallic precursor compounds will occur, rather than other possible chemical reactions such as the decomposition of the molten salt. The electrolyte is a salt, preferably a salt that is more stable than the equivalent salt of the metals being refined and ideally very stable to remove the oxygen or other gas to a desired low level. The chlorides and mixtures of chlorides of barium, calcium, cesium, lithium, strontium, and yttrium are preferred. The chemical reduction is preferably, but not necessarily, carried to completion, so that the nonmetallic precursor compounds are completely reduced. Not carrying the process to completion is a method to control the oxygen content of the metal produced.

Optionally, the nonmetallic precursor compound(s) are pre-consolidated, step 21, after the furnishing step 20 and before the chemical reduction step 22. Such a pre-consolidation results in a porous compact that is chemically reduced in step 22 to form a sponge-like metallic material. The sponge-like metallic material may be used directly as welding rod, omitting the following step 24, or it may be further consolidated in subsequent step 24.

In yet another reduction approach, termed "rapid plasma quench" reduction, the nonmetallic precursor compound such as titanium chloride is dissociated in a plasma arc at a temperature of over 4500° C. The nonmetallic precursor compound is rapidly heated, dissociated, and cooled. The result is fine metallic particles. Any melting of the metallic particles is very brief, on the order of 10 seconds or less, and is within the scope of "without melting" and the like as used herein.

An advantage of all of these reduction techniques is that innoculants and other components may be readily introduced into or mixed with the particles. The innoculants are preferably introduced after the nonmetallic precursor compounds are furnished in step 20, and before the consolidation step 24. Such innoculants might include, for example, intentionally introduced oxygen or nitrogen that produces oxide or nitride particles which serve to refine the grain size of the weldment that is produced when metallic material is eventually used as a welding rod.

The result of the chemical reduction step 22 is a plurality of particles or the pre-consolidated rod (if step 21 is used in conjunction with the solid-phase reduction process), with each particle or pre-consolidated-rod comprising the metallic material. These particles are made without melting of the precursor compound(s) or of the metallic material. The particles have low contents of impurities, such as metallic impurities, ceramic impurities, undesirable oxides, and the like, that result from conventional melting operations, unless oxygen or nitrogen is intentionally introduced to produce a high oxygen, oxide, nitrogen, or nitride content of a desired structure and arrangement.

The particles are consolidated to make a rod, step 24, if the step 21 was not used, or the pre-consolidated sponge-like rod may be further consolidated in step 24. Any operable consolidation approach may be used, preferably an approach wherein the particles and the rod are not melted. A preferred approach is containerized extrusion, wherein the particles are sealed into a container, the container is extruded to consolidate and mechanically compact the particles together to form the rod, and then the container is removed to leave the rod. Other components such as solid fluxes may be mixed with the particles before they are sealed into the container.

FIG. 2 illustrates such a rod 30 produced by the containerized extrusion. The rod is elongated and may be of any operable shape, but is preferably cylindrically symmetric. The rod may be of any length, either discrete lengths or a long piece of material that is usually coiled. The rod may be of any operable diameter, including what is sometimes termed "rod" and what is sometimes termed "wire", both of which are encompassed under the term rod herein.

Figure 4:
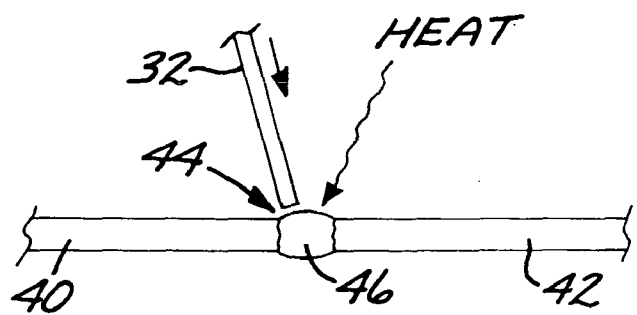
FIG. 4 is a schematic view of welding rod being used to join two pieces of substrate material together.
Figure 5:
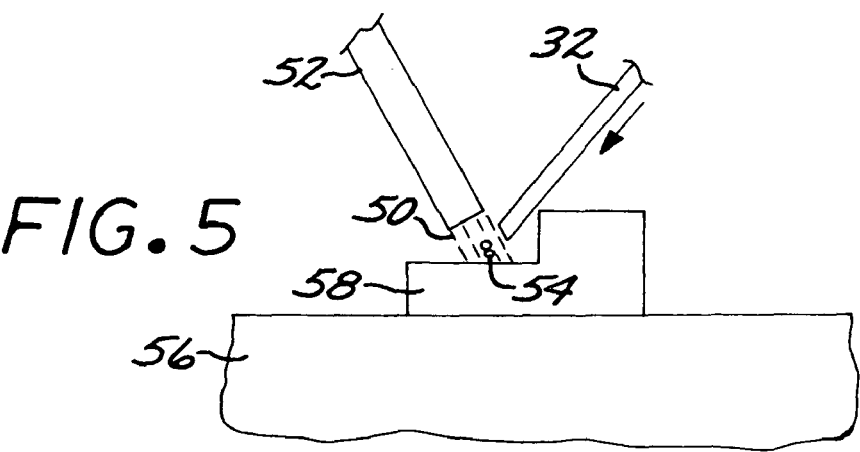
FIG. 5 is a schematic view of welding rod being used to build up a structure.

The rod 30 may be used for any purpose, but it is preferably used as a welding-rod feed, step 26. FIGS. 3-5 illustrate in basic form three uses of the rod 30 as a welding-rod feed. FIG. 3 illustrates the rod being used as a welding rod 32 to provide a filler metal to repair a defective volume 34 at a surface of a single piece 36 of substrate material. The welding rod 32 may be of the same composition as the piece 36 of substrate material, so that the repaired volume is of the same composition as the piece 36 of substrate material. Alternatively, the welding rod 32 may be of a different composition than the piece 36 of substrate material, so that the repaired volume is of the different composition than the piece 36 of substrate material. In this utilization, the defective volume 34, such as a crack or pit, is usually cleaned and defective material is removed. The defective volume 34 is heated by any operable approach to locally melt the substrate material, and the welding rod 32 is fed into the molten region. The welding rod 32 melts to form a molten pool, which solidifies as a weldment 38 upon cooling. This same approach may be used to deposit a weldment overlay onto the single piece 36, of either the same composition as the substrate material or of a different composition, such as a protective hard coating onto a softer piece 36.

FIG. 4 illustrates the rod 30 being used as the welding rod 32 to join a first piece 40 of a first substrate material and a second piece 42 of a second substrate material. If the first substrate material and the second substrate material are of the same composition, the welding rod 32 is preferably of that same composition. If the first substrate material and the second substrate material are of different compositions, the welding rod 32 may be of the same composition as one of the first substrate material and the second substrate material, or it may be of a completely different composition such as an intermediate composition. In any event, a joint volume 44 where the two pieces 40 and 42 are brought into a closely facing or contacting relation is heated by any operable approach to locally melt the substrate material, and the welding rod 32 is fed into the molten region. The welding rod 32 melts to form a molten pool, which solidifies as a weldment 46 upon cooling. The weldment joins the pieces 40 and 42.

FIG. 5 illustrates the welding rod 32 being fed into the beam 50 of a laser 52. The welding rod 32 is melted to form droplets 54 or segmented to form small solid pieces of the metal, which are then deposited upon a substrate 56. The droplets 54 gradually form a buildup structure 58 that may be of the same composition as the substrate 56 or a different composition. This approach may be used, for example, to fabricate complex structures such as ducts with an integral waffle-grid reinforcement pattern.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:
1. A method of manufacturing an article comprising a metallic
alloy material having its constituent elements, comprising the steps of
furnishing at least one nonmetallic precursor compound, the nonmetallic precursor compound or compounds collectively including the constituent elements of the metallic alloy material in their respective constituent-element proportions; thereafter
producing metallic alloy material particles by chemically reducing the precursor compounds, the metallic alloy material particles having more than one metallic element, without melting the metallic alloy material particles, wherein the metallic alloy material is a titanium-base material; and thereafter
consolidating the metallic alloy material particles into a rod, without melting the metallic alloy material particles.

2. The method of claim 1, wherein the step of furnishing at least one nonmetallic precursor compound includes the step of
furnishing the at least one nonmetallic precursor compound comprising metal-oxide precursor compounds.

3. The method of claim 1, wherein the step of furnishing at least one nonmetallic precursor compound includes the step of
furnishing the at least one nonmetallic precursor compound comprising metal-halide precursor compounds.

4. The method of claim 1, wherein the step of producing metallic alloy material particles by chemically reducing includes the step of
chemically reducing the mixture of nonmetallic precursor compounds by solid-phase reduction.

5. The method of claim 1, wherein the step of producing metallic alloy material particles by chemically reducing includes the step of
chemically reducing the compound mixture by vapor-phase reduction.

6. The method of claim 1, wherein the step of consolidating includes the step of
consolidating the metallic alloy material particles by containered extrusion, wherein the metallic alloy material particles are sealed into a container, the container is extruded to consolidate and mechanically compact the metallic alloy material particles together to form the rod, and then the container is removed to leave the rod.

7. The method of claim 1, including an additional step, after the step of furnishing and before the step of producing metallic alloy material particles by chemically reducing, of
pre-consolidating the precursor compounds.

8. The method of claim 1, including an additional step, after the step of consolidating, of
utilizing the rod as a welding-rod feed.

9. The method of claim 1, including an additional step, after the step of furnishing and before the step of consolidating, of
introducing an innoculant.

10. The method of claim 1, including an additional step, after the step of consolidating, of utilizing the rod in a welding operation selected from the group consisting of
utilizing the rod as a filler metal at a surface of a single piece of a filled substrate material,
utilizing the rod to join a first piece of a first substrate material and a second piece of a second substrate material together,
utilizing the rod to form droplets or to be segmented to form small solid pieces of the metal, which are then deposited upon a deposition substrate, and
combinations thereof.

11. A method of manufacturing an article comprising a metallic alloy material having its constituent elements, comprising the steps of
furnishing at least one nonmetallic precursor compound, the nonmetallic precursor compound or compounds collectively including the constituent elements of the metallic alloy material in their respective constituent-element proportions; thereafter
producing metallic alloy material particles by chemically reducing the precursor compounds, the metallic alloy material particles having more than one metallic element, without melting the metallic alloy material particles, wherein the metallic alloy material is a titanium-base material; thereafter
consolidating the metallic alloy material particles into a rod, without melting the metallic alloy material particles; and thereafter
utilizing the rod as a welding-rod feed.

12. The method of claim 11, wherein the step of furnishing at least one nonmetallic precursor compound includes the step of
furnishing the at least one nonmetallic precursor compound comprising metal-oxide precursor compounds.

13. The method of claim 11, wherein the step of furnishing at least one nonmetallic precursor compound includes the step of
furnishing the at least one nonmetallic precursor compound comprising metal-halide precursor compounds.

14. The method of claim 11, wherein the step of producing metallic alloy material particles by chemically reducing includes the step of
producing the metallic material as a nickel-base superalloy.

15. The method of claim 11, wherein the step of producing metallic alloy material particles by chemically reducing includes the step of
chemically reducing the mixture of nonmetallic precursor compounds by solid-phase reduction.

16. The method of claim 11, wherein the step of producing metallic alloy material particles by chemically reducing includes the step of
chemically reducing the compound mixture by vapor-phase reduction.

17. The method of claim 11, wherein the step of consolidating includes the step of
consolidating the metallic alloy material particles by containered extrusion, wherein the metallic alloy material particles are sealed into a container, the container is extruded to consolidate and mechanically compact the particles together to form the rod, and then the container is removed to leave the rod.

18. The method of claim 11, wherein the step of utilizing the rod as a welding-rod feed includes the step of utilizing the rod in a welding operation selected from the group consisting of
utilizing the rod as a filler metal at a surface of a single piece of a filled substrate material,
utilizing the rod to join a first piece of a first substrate material and a second piece of a second substrate material together,
utilizing the rod to form droplets or to be segmented to form small solid pieces of the metal, which are then deposited upon a deposition substrate, and
combinations thereof.

19. A method of manufacturing an article comprising a metallic alloy material having its constituent elements, comprising the steps of furnishing at least one nonmetallic precursor compound, the nonmetallic precursor compound or compounds collectively including the constituent elements of the metallic alloy material in their respective constituent-element proportions; thereafter consolidating the nonmetallic precursor compounds to form consolidated precursor compounds; and thereafter producing metallic alloy material particles by chemically reducing the consolidated precursor compounds, the metallic alloy material particles having more than one metallic element, without melting the metallic alloy material particles, wherein the metallic alloy material is a titanium-base material.

20. The method of claim 19, including additional steps, after the step of producing metallic alloy material particles by chemically reducing, of consolidating the metallic alloy material particles into a rod; and utilizing the rod in a welding operation selected from the group consisting of utilizing the rod as a filler metal at a surface of a single piece of a filled substrate material, utilizing the rod to join a first piece of a first substrate material and a second piece of a second substrate material together, utilizing the rod to form droplets or to be segmented to form small solid pieces of the metal, which are then deposited upon a deposition substrate, and combinations thereof.

* * * * *